Patented Jan. 16, 1923.

1,442,585

UNITED STATES PATENT OFFICE.

BERNHARD SCHMIDT, OF MILWAUKEE, WISCONSIN.

CLAY FLUX.

No Drawing.   Application filed August 27, 1921. Serial No. 496,091.

*To all whom it may concern:*

Be it known that I, BERNHARD SCHMIDT, a citizen of the United States, residing at Milwaukee, county of Milwaukee, and State of Wisconsin, have invented new and useful Improvements in Clay Fluxes, of which the following is a specification.

This invention relates to a composition of matter and more particularly to a composition adapted to be used in the manufacture of brick or other clay products.

It is the object of this invention to provide a flux which may be added to clay in the manufacture of brick or other baked clay products which will bring about a perfect union of the materials used therein at lower kiln temperatures than it has heretofore been possible to use.

It is a further object of this invention to provide a flux adapted to be added to clay in the process of making bricks or articles of kilned clay which will not only cause the clay to become perfectly bonded or annealed at lower temperatures than have hitherto been possible in brick making, but which will also neutralize the injurious effects hitherto experienced where lime was present in the clay.

It is a further object to produce by a novel combination of ingredients a brick or burned clay article which can not only be manufactured more economically than has heretofore been possible, but which will also be a more satisfactory article in that it will be harder and more impervious than bricks heretofore made.

It is a further object to produce a tougher, more elastic and less friable product of clay able to withstand blows and not so likely to crumble with rough usage or handling in transportation.

It is a further object to render clay products more easily colored by using coloring matter which would not be effective at the high temperature now required and by reason of the lower temperature obtaining more pleasing, effective and uniform color.

While large sums of money have been spent in the development of brick making machinery, adapted to handle the clay in the manufacture of bricks, the art of treating the clay to adapt it for use in brick making is comparatively undeveloped. Some attempts have been made to produce a flux adapted to cause clay bricks to become vitrified at lower temperatures than those ordinarily used but those attempts have been comparatively unsuccessful. By far the larger number of brick manufacturers have been satisfied to waste time and money in baking bricks made up of natural clay in the form in which it is conveniently located in the vicinity of their establishments.

It is, therefore, more specifically an object of this invention to provide means whereby a flux may be intelligently added to natural clay in quantities varying with the nature of the clay to transform it into a composition of the best possible nature for the manufacture of brick and clay products generally.

In the preparation of a flux by which the objects above specified can be accomplished, I first compound a mixture hereafter called mixture #1 of the principal or more important ingredients, and later add this first or #1 mixture to other ingredients to form the completed flux.

The first mixture above referred to is made up of one part each by weight of pulverized glass, sea salt, pulverized granite and oxidized zinc. In pulverizing the granite I have found it advisable to apply heat during the pulverizing process to cause the granite to crumble more readily. These several elements having been thoroughly mixed are ground to a fine powder. In case difficulty is experienced in the grinding process, water may be added to cause these ingredients to assume the form of a smooth paste. Since these elements are to be used as a flux, it is preferable to have them thoroughly mixed and thoroughly pulverized.

Mixture #1, prepared in accordance with the foregoing directions, is used with other ingredients to form the completed flux. For use with various kinds of clay the proportions of the ingredients are altered to an extent determinable by an analysis of the clay. I have found that one of three formulæ will give good results with any clay. Thus a person dealing in the flux embodying this invention need only be provided with three forms of flux to meet the requirements of any customer. The three formulæ, each prepared on a basis of ten are given as follows:—

| Formula A. | Formula B. | Formula C. |
|---|---|---|
| 3 | 3½ | 4 parts of salt. |
| ¼ | ½ | 1 part of borax. |
| ½ | 1 | 2 parts of mixture #1. |
| 1 | 1 | ½ part of ochre. |
| ¼ | ½ | 1 part of lead. |
| 5 | 3½ | 1½ parts of sand. |
| 10 | 10 | 10 |

Where an analysis of the clay shows any of the named elements to be present, an appropriate formula will be selected which contains less of the elements found in the clay. If the clay is mixed wet and hard water is used for this purpose, it is also important in securing the best result to analyze the water, for water frequently contains sufficient quantities of the above named substances to produce a radical change in result. As is indicated above, the flux, prepared by the use of the above stated formulæ and in accordance with the process herein set forth, is adapted for use either wet or dry in whichever method of brick making is used by a given manufacturer.

To secure the best results, 15 to 40 pounds of flux, prepared in accordance with the above described formula, should be used with each 2 tons of clay to produce approximately 1000 brick or a corresponding amount of pottery. Clay incorporating large amounts of silica and aluminum in its natural state, will require a larger proportion of the improved flux than clay which is comparatively free from these elements.

Where the clay and flux are to be mixed dry, as is necessary in one mode of brick manufacture, it is sometimes difficult and expensive to secure the proper mixing of so small a quantity of flux thru a large mass of clay. Under these circumstances it is desirable to mix the flux with fine sand in the proportion of 1 to 3 by weight. The flux, being thoroughly mixed with the sand, can then be effectively distributed thru the 2 ton mass of clay.

As previously stated, it is preferable to adhere quite closely to the formula which is best suited for the particular clay to be treated. The formulæ as given above give very accurate results considering the comparatively wide variance in chemical composition of the clays used. With the above noted ingredients prepared and mixed with the clay in the manner set forth, it will be found possible to make better bricks at lower temperatures than heretofore. The exact proportions needed to secure the best results with a given clay can then be readily ascertained by those skilled in the art. As stated above, an analysis of the clay, which indicates that certain of the ingredients mentioned already exist therein, will suggest the proper modification of the formula to suit the clay at hand.

The composition herein described is primarily intended for use as a flux in the manufacture of ordinary brick. When so used, it produces a very hard and compact brick of reduced porosity, the product being improved, in addition to the reduction effected in the cost of manufacture. The composition has other uses, however, since it is adapted to serve as a base to which other materials may be added to produce an enameled brick and it may also be used without change to produce a glazed brick. Where it is desired to produce a glazed brick, it is only necessary to coat the surface of the brick with the flux in its concentrated form before the brick is fired or baked. If so desired, larger quantities of the flux in proportion to the clay may be used to produce a brick which will be homogeneously glazed thruout. Where large quantities of flux in proportion to the clay are used, as in the above stated method of making glazed bricks, the kiln temperatures may be reduced to as low as ten or eleven hundred degrees Fahrenheit, whereas the normal kiln temperatures now used are approximately eighteen hundred degrees Fahrenheit. I believe that it is impossible without the use of my improved flux to make any well baked product of clay at a kiln temperature of less than 1400° F., but where the flux is present, even in the smallest portions stated above, the average temperature which is used to secure good results is approximately 1200° F. The saving in fuel effected by the use of the flux herein described is a great deal more than sufficient to compensate for the cost of the flux.

The ocher included in the formula gives the brick the desired rich color and is practically unaffected by the comparatively low degree of heat made possible by the use of this flux. It was formerly inadvisable to use this coloring material because of the great change in color produced by the high kiln temperatures.

It will be understood that the flux described herein is intended for use in the manufacture of all products from clay. In my experiments I have not only demonstrated the success of this flux in the manufacture of brick but have also used it in the manufacture of clay pottery, and particularly of flower pots. A flower pot made of clay in its natural state was subjected to the same degree of heat as was a flower pot in which the flux of this invention was incorporated. The first mentioned flower pot was underbaked and could be broken readily with the fingers, whereas the second flower pot in which the flux was used was a thoroughly baked vitreous pot, homogeneous thruout and almost unbreakable. Pots of the second sort, made by using the improved flux of this invention can be manufactured at a saving in fuel of thirty to forty per cent by reason of the lower temperatures required in the kiln. Thus it will be seen that not only brick but other clay products as well can be produced in better form and at lower cost by the use of this invention than has heretofore been possible.

I claim:—

1. A flux for clay including pulverized glass, salt, pulverized granite and oxidized zinc.

2. A flux for clay including pulverized glass, salt, pulverized granite and oxidized zinc, the ingredients being mixed in equal proportions by weight and ground to a fine powder.

3. A flux adapted to be mixed with clay to facilitate its treatment by heat including pulverized glass, sea salt, pulverized granite and oxidized zinc mixed with salt, borax, and oxide of lead.

4. A flux adapted to be added to clay to facilitate its treatment by heat including a mixture of pulverized glass, sea salt, pulverized granite and oxidized zinc to be added in approximately the proportion of one part in 10 to the further ingredients of 3 parts of salt, $\frac{1}{2}$ part of borax, $\frac{1}{2}$ part of oxide of lead, one part of coloring matter and 4 parts of sand.

5. A clay product including clay in combination with a flux made up of pulverized glass, sea salt, pulverized granite and pulverized oxide of zinc.

6. A clay product composed of clay in combination with a flux including pulverized glass, sea salt, pulverized granite, and pulverized oxide of zinc with salt, borax, and oxide of lead.

7. A clay flux including glass, salt, granite and zinc and adapted when mixed with clay to enable the compound to be burned at temperatures under 1400° F. to form perfectly annealed products.

BERNHARD SCHMIDT.